(12) United States Patent
Sikdar et al.

(10) Patent No.: US 7,251,722 B2
(45) Date of Patent: Jul. 31, 2007

(54) SEMANTIC PROCESSOR STORAGE SERVER ARCHITECTURE

(75) Inventors: Somsubhra Sikdar, San Jose, CA (US); Kevin Jerome Rowett, Cupertino, CA (US)

(73) Assignee: Mistletoe Technologies, Inc., Cupertino, CA (US)

( * ) Notice: Subject to any disclaimer, the term of this patent is extended or adjusted under 35 U.S.C. 154(b) by 399 days.

(21) Appl. No.: 10/843,727

(22) Filed: May 11, 2004

(65) Prior Publication Data

US 2005/0268032 A1   Dec. 1, 2005

(51) Int. Cl.
G06F 9/30 (2006.01)
G06F 9/22 (2006.01)

(52) U.S. Cl. .................. 712/300; 712/208; 713/150
(58) Field of Classification Search .............. None
See application file for complete search history.

(56) References Cited

U.S. PATENT DOCUMENTS

| | | | |
|---|---|---|---|
| 5,487,147 A | 1/1996 | Brisson | |
| 5,781,729 A | 7/1998 | Baker et al. | |
| 5,793,954 A | 8/1998 | Baker et al. | |
| 5,916,305 A | 6/1999 | Sikdar et al. | |
| 6,000,041 A | 12/1999 | Baker et al. | |
| 6,034,963 A | 3/2000 | Minami et al. | |
| 6,145,073 A | 11/2000 | Cismas | |
| 6,266,700 B1 | 7/2001 | Baker et al. | |
| 6,330,659 B1 | 12/2001 | Poff et al. | |
| 6,356,950 B1 | 3/2002 | Tillmann et al. | |
| 6,493,761 B1 | 12/2002 | Baker et al. | |
| 6,985,964 B1 | 1/2006 | Petersen et al. | |
| 7,020,128 B1 * | 3/2006 | Gladden et al. ............ 370/352 |
| 2001/0056504 A1 | 12/2001 | Kuznetsov | |
| 2004/0148415 A1 * | 7/2004 | Sikdar ..................... 709/230 |
| 2004/0172544 A1 * | 9/2004 | Luo et al. ................. 713/189 |
| 2004/0215665 A1 * | 10/2004 | Edgar et al. .............. 707/200 |
| 2005/0021825 A1 * | 1/2005 | Kishore et al. ............ 709/232 |
| 2005/0165966 A1 | 7/2005 | Gai et al. | |
| 2006/0026430 A1 * | 2/2006 | Luo ......................... 713/176 |

OTHER PUBLICATIONS

"How Computer Work", Ron White, 6th edition, 2002, Que corporation, pp. 144-145, 190-193, 198-209, and 250-251.*
*Can Programming be Liberated from the von Neumann Style? A Functional Style and Its Algebra of Programs* (John Backus, Communications of the ACM, Aug. 1978, vol. 21 No. 8, pp. 613-641).
*Compilers Principles, Techniques, and Tools* (Alfred V. Aho, Ravi Sethi, Jeffrey D. Ullman, Mar. 1988, pp. 186-192, 216-257).

* cited by examiner

*Primary Examiner*—B. James Peikari
(74) *Attorney, Agent, or Firm*—Marger Johnson & McCollom, PC

(57) ABSTRACT

A storage server uses a semantic processor to parse and respond to client requests. A direct execution parser in the semantic processor parses an input stream, comprising client storage server requests, according to a defined grammar. A semantic processor execution engine capable of manipulating data (e.g., data movement, mathematical, and logical operations) executes microcode segments in response to requests from the direct execution parser in order to perform the client-requested operations. The resulting operational efficiency allows an entire storage server to be collapsed in some embodiments into a few relatively small integrated circuits that can be placed on a media device's printed circuit board, with the semantic processor itself drawing perhaps a few Watts of power.

28 Claims, 7 Drawing Sheets

SEMANTIC PROCESSOR STORAGE SERVER ARCHITECTURE

REFERENCE TO RELATED APPLICATIONS

U.S. patent application Ser. No. 10/351,030, now U.S. Pat. No. 7,130,987, titled "Reconfigurable Semantic Processor," filed by Somsubhra Sikdar on Jan. 24, 2003, is incorporated herein by reference.

FIELD OF THE INVENTION

This invention relates generally to storage servers, and more specifically to storage server implementations using digital semantic processors.

BACKGROUND OF THE INVENTION

Traditionally, a storage server is a networked computer that provides media and file access to other computers and computing devices, referred to herein as "clients." The storage server may be accessible on a Wide-Area Network (WAN), a Local-Area Network (LAN), and/or share a dedicated point-to-point connection with another computing device.

Storage servers can be of several types, including a Network Attached Storage (NAS) server, a Storage Area Network (SAN) server, and an application-style server.

A NAS server comprehends directory structures. Requests to a NAS server generally specify a file path/filename and action such as create, read, write, append, etc. A NAS server converts the requests to one or more disk sector/block disk access transactions, accesses the disk (or other storage media), and performs the requested file-level transaction. Such a server maintains and utilizes a directory structure to locate the file starting locations, and a File Allocation Table to reconstruct segmented files and locate free sectors on a disk or other writeable media.

A SAN server generally receives direct requests for disk sector/block-based transactions, and may have no knowledge of a file system or relationships between data blocks. Although block requests can relate to physical block locations on a media device, more typically a SAN server supports logical blocks—thus allowing the server to make one physical disk drive appear as several logical drives, or several physical disk drives appear as one logical drive, as in a RAID (Redundant Array of Independent Disks) scheme.

An application-style server generally provides access to media in a media-specific format. For instance, an application-style server could provide access to streaming audio or video without the explicit knowledge of a filepath/filename by the client (who may not know the filename or have the authority to access a file directly), while reading the streaming media from files and encapsulating it in a streaming packet format.

Architecturally, most storage servers differ little from general-purpose computers (other than in some cases including more and/or faster than usual disk drives and disk bus controllers). FIG. 1 shows a block diagram for a typical storage server 20. A Central Processing Unit (CPU) 22, typically one or more microprocessors, operates the server according to stored program instructions. This type of processor is often called a von Neumann (VN) processor or machine, after its innovator, who proposed its execution style of processing sequential instructions.

CPU 22 connects through a Frontside Bus (FSB) 26 to a Memory Controller/Hub (MCH) 24, which is responsible for interfacing CPU 22 to other system components that store microprocessor program instructions and store, supply, and/or consume data. MCH 24 manages system memory 30 through memory bus 32. MCH 24 also communicates with PCI (Peripheral Component Interconnect) bridge 40 across hub bus 42 to move data between PCI-connected devices and either memory 30 or CPU 22.

Many different types of data source/sink devices can connect to server 20 through PCI bridge 40 and PCI bus 44. For storage server purposes, the two necessary devices are a network interface card (NIC) 50 and a media controller, such as ATA (AT Attachment) controller 60.

NIC 50 allows the server to attach directly to a Local Area Network (LAN) or other network, a Fibre Channel switch fabric, or other point-to-point connection to a client or another device that provides network visibility for the server. NIC 50 thereby provides a communication path for the server to receive data requests from clients and respond to those requests. The actual network physical communication protocol can be varied by inserting a different NIC, e.g., for whatever wired or wireless communication protocol is to be used, and loading a software device driver for that NIC onto CPU 22.

ATA controller 60 provides at least one ATA bus 62 for attaching media devices 64 such as hard disks, optical disks, and/or tape drives. Each ATA bus 62 allows either one or two media devices 64 to attach to storage server 20. Some servers may employ other controllers, such as a SATA (serial ATA) controller or a SCSI (Small Computer System Interface) host adapter.

In order to operate as a storage server, CPU 22 must execute a variety of software programs. With NAS, the two common formats are NFS (Networked File System) and CIFS (Common Internet File System); the former protocol is found primarily in UNIX environments, and the latter protocol in Microsoft operating system environments. For an NFS server, the following software processes help implement NFS: a network device driver for NIC 50; TCP/IP drivers; RPC (Remote Procedure Call) and XDR (External Data Representation) drivers to present data from TCP/IP to NFS server software; the NFS server software itself; a local file system; a VFS (Virtual File System) driver to interface the NFS server software with the local file system; data buffering software; and device drivers for the storage controller/host adapter. For each NFS data transaction, CPU 22 must execute a process for each of these software entities, switching context between them as required. To provide adequate performance, storage server 20 operates at relatively high speed and power, requiring forced air cooling and a substantial power supply to operate the microprocessor, chipset, network interface, memory, other peripherals, and cooling fans. The current state of the art, with a 1 Gbps (Gigabit per second) full duplex network connection, requires about 300 watts of power, occupies a volume of 800 cubic inches, and costs about $1500 without storage media.

Some vendors have attempted to build custom integrated circuit hardware explicitly for processing NAS requests. Design costs for such circuits generally cannot be recaptured in the fluid world of telecommunication protocols, where a specific complex circuit built to handle a narrow combination of specific protocols and storage interfaces may become rapidly obsolete.

SUMMARY OF THE INVENTION

It has now been recognized that in many storage server applications a microprocessor/sequential program approach is inefficient and bulky. Most of the storage server's existence is spent executing storage server functions in response to client requests received at the NIC. The requests themselves are styled in a protocol-specific format with a limited number of requested functions and options. In response to these requests, well-defined storage system commands are supplied to a media device, and the results of those commands are used to return protocol-specific datagrams to the client.

Storage server programmability and code commonality are highly desirable traits. Accordingly, high-volume processors and chipsets (such as those built by Intel Corporation and Advanced Micro Devices) have been used to allow programmability and the use of standard operating systems, and thereby reduce costs. Unfortunately, the flexibility and power of a general-purpose microprocessor-based system go largely unused, or used inefficiently, in such an operational configuration.

The present invention provides a different architecture for a storage server, using in exemplary embodiments what is referred to generally as a semantic processor. Such a device is configurable, and preferably reconfigurable like a VN machine, as its processing depends on its "programming." As used herein, a "semantic processor" contains at least two components: a direct execution parser to parse an input stream according to a defined grammar; and an execution engine capable of manipulating data (e.g., data movement, mathematical, and logical operations) in response to requests from the direct execution parser.

The programming of a semantic processor differs from the conventional machine code used by a VN machine. In a VN machine the protocol input parameters of a data packet are sequentially compared to all possible inputs using sequential machine instructions, with branching, looping, and thread-switching inefficiencies. In contrast, the semantic processor responds directly to the semantics of an input stream. In other words, the "code" segments that the semantic processor executes are driven directly by the input data. For instance, of the 75 or so possible CIFS commands that could appear in a packet, a single parsing cycle of an embodiment described below is all that is necessary to allow the semantic processor to load grammar and microinstructions pertinent to the actual CIFS command sent in the packet.

In a storage server application as described in the embodiments below, a semantic processor can perform many of the functions of the prior art VN processor, chipset, and attached devices. The semantic processor receives datagrams from a network port or datagram interface. Some of these datagrams will include client requests for data operations. The semantic processor parses elements of the received datagrams using a parser table designed for the server protocol grammar(s) supported by the server. Based on what is parsed, the semantic processor transacts responsive data operations with a data storage device or devices. Generally, the data operations are performed by launching microinstruction code segments on a simple execution unit or units. As the data operations are performed, the semantic processor generates response datagrams to send back to the client. The resulting operational efficiency allows an entire storage server to be collapsed in some embodiments into a few relatively small integrated circuits that can be placed on a media device's printed circuit board, with the semantic processor itself drawing perhaps a few Watts of power.

BRIEF DESCRIPTION OF THE DRAWING

The invention may be best understood by reading the disclosure with reference to the drawing, wherein.

DETAILED DESCRIPTION OF THE PREFERRED EMBODIMENTS

Figure 1:
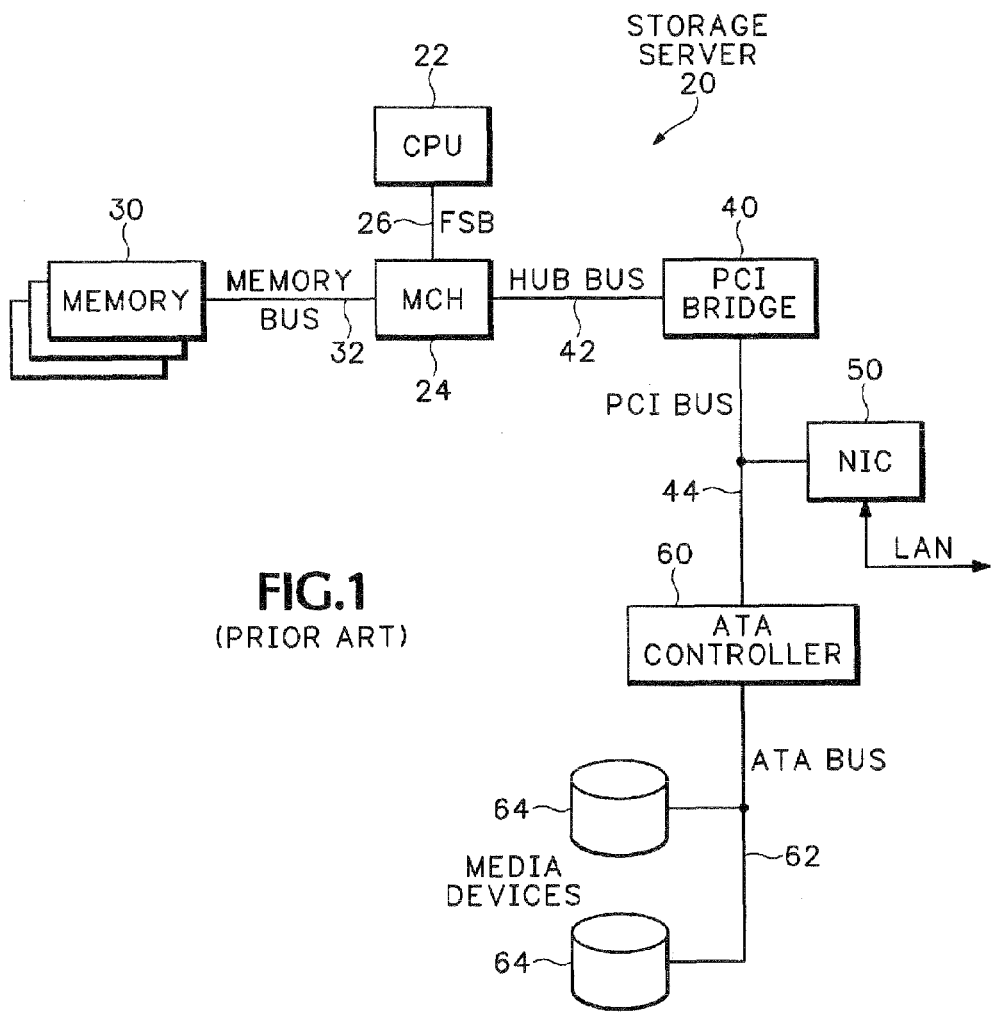
FIG. 1 contains a block diagram for a typical von Neumann machine storage server.
Figure 2:
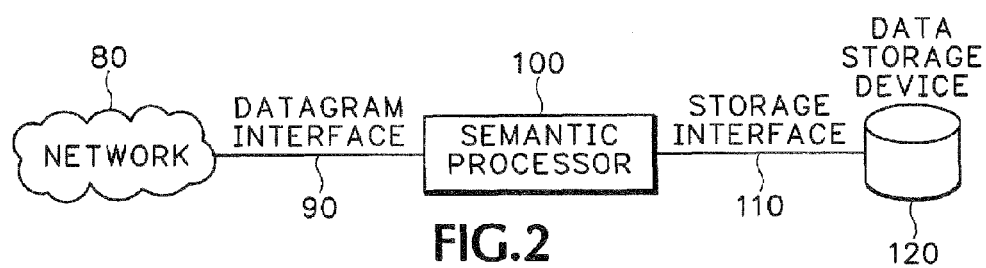
FIG. 2 contains a block diagram for a generic storage server embodiment of the present invention.

FIG. 2 illustrates a high-level diagram representative of many embodiments of the present invention. A storage server comprises a semantic processor 100 with a datagram interface 90 and a storage interface 110. The datagram interface 90 provides client connectivity to the server, e.g., over network 80 as shown or via a point-to-point connection to the client. The storage interface 110 provides a path for the semantic processor to initiate data transactions with data storage device 120 in response to client requests. The data storage device may be local. The data storage device alternately may be network-connected to the illustrated server, e.g., if the semantic processor 100 emulates a NAS server to clients, while at the same time using remote SAN servers for physical storage.

Figure 3:
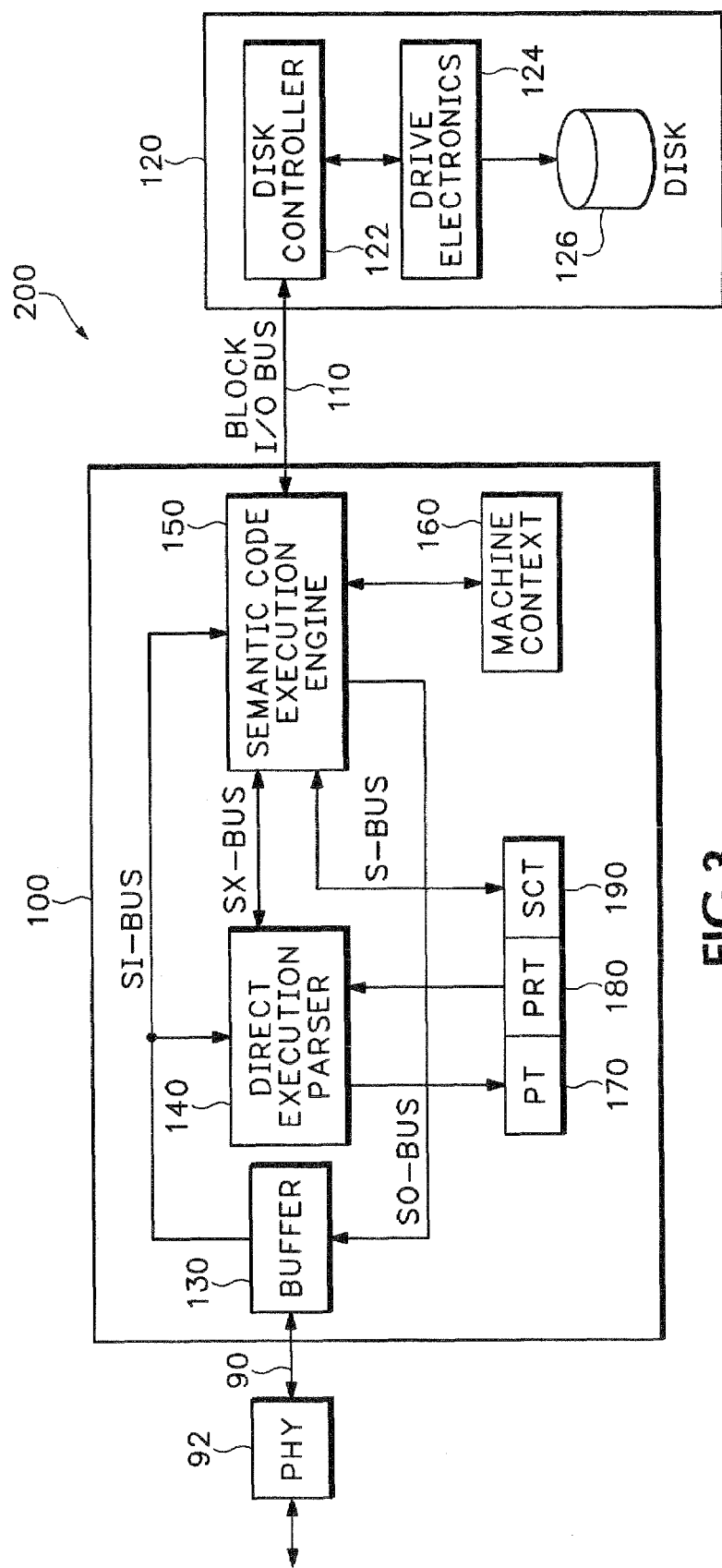
FIG. 3 illustrates, in block form, a more-detailed storage server embodiment of the invention.

FIG. 3 contains a more-detailed block diagram of a storage server 200, including a semantic processor 100. The datagram interface 90 connects buffer 130 of semantic processor 100 to a physical interface device (PHY) 92, e.g., an optical, electrical, or radio frequency driver/receiver pair for an Ethernet, Fibre Channel, 802.11x, Universal Serial Bus, Firewire, or other physical layer interface. The datagram interface supplies an input digital data stream to buffer 130, and receives an output digital data stream from buffer 130.

In FIG. 3, the storage interface 110 is implemented as a block I/O bus between a data storage device 120 and the semantic processor 100. In various embodiments, this bus can be a cabled connection (iSCSI, Fibre Channel, SATA) or circuit board bus (SATA), depending on the configured capability of the semantic processor and the data storage device. FIG. 3 shows major elements of a hard disk type of media device, e.g., a disk controller 122, drive electronics 124, and the disk platter(s), motor, and read/write heads 126.

One configuration for a semantic processor 100 is illustrated in the storage server of FIG. 3. Semantic processor 100 contains a direct execution parser (DXP) 140 that controls the processing of input packets or frames received at buffer 130 (e.g., the input "stream"). DXP 140 maintains an internal parser stack of terminal and non-terminal symbols, based on parsing of the current frame up to the current symbol. When the symbol at the top of the parser stack is a terminal symbol, DXP 140 compares data at the head of the input stream to the terminal symbol and expects a match in order to continue. When the symbol at the top of the parser stack is a non-terminal symbol, DXP 140 uses the non-terminal symbol and current input data to expand the grammar production on the stack. As parsing continues, DXP 140 instructs semantic code execution engine (SEE) 150 to process segments of the input, or perform other operations.

This structure, with a sophisticated grammar parser that assigns tasks to an execution engine, as the data requires, is both flexible and powerful for highly structured input such as datagram protocols. In preferred embodiments, the semantic processor is reconfigurable by modifying its tables, and thus has the flexibility appeal of a VN machine. Because the semantic processor responds to the input it is given, it can generally operate efficiently with a smaller instruction set than a VN machine. The instruction set also benefits because the semantic processor allows data processing in a machine context, as will be explained below.

Semantic processor 100 uses at least three tables to perform a given function. Codes for retrieving production rules are stored in a parser table (PT) 170. Grammatical production rules are stored in a production rule table (PRT) 180. Code segments for SEE 150 are stored in semantic code table (SCT) 190.

The codes in parser table 170 point to production rules in table 180. Parser table codes are stored, e.g., in a row-column format or a content-addressable format. In a row-column format, the rows of the table are indexed by a non-terminal code on the internal parser stack, and the columns of the table are indexed by an input data value at the head of the input (e.g., the symbol currently on the Si-Bus). In a content-addressable format, a concatenation of the non-terminal code and the input data value can provide the input to the table.

The production rule table 180 is indexed by the codes in parser table 170. The tables can be linked as shown in FIG. 3, such that a query to the parser table will directly return the production rule applicable to the non-terminal code and input data value. The direct execution parser replaces the non-terminal code at the top of its stack with the production rule returned from the PRT, and continues to parse its input.

Practically, codes for many different grammars can exist at the same time in a production rule table. For instance, one set of codes can pertain to MAC (Media Access Control) packet header format parsing, and other sets of codes can pertain to Address Resolution Protocol (ARP) packet processing, Internet Protocol (IP) packet processing, Transmission Control Protocol (TCP) packet processing, Real-time Transport Protocol (RTP) packet processing, etc. Grammars for CIFS, NFS, and/or other storage server protocols are added to the production rule code memory in order to add storage server capability. Non-terminal codes need not be assigned in any particular order in production rule code memory 122, nor in blocks pertaining to a particular protocol.

The semantic code table 190 can be indexed by parser table codes, and/or from production rule table 180. Generally, parsing results allow DXP 140 to detect whether, for a given production rule, a code segment from semantic code table 190 should be loaded and executed by SEE 150.

The semantic code execution engine 150 has an access path to machine context 160, which is a structured memory interface, addressable by contextual symbols. Machine context 160, parser table 170, production rule table 180, and semantic code table 190 may use on-chip memory, external memory devices such as synchronous DRAMs and CAMs, or a combination of such resources. Each table or context may merely provide a contextual interface to a shared physical memory space with one or more of the other tables or contexts.

Detailed design optimizations for the functional blocks of semantic processor 100 are not within the scope of the present invention. For some examples of the detailed architecture of applicable semantic processor functional blocks, the reader is referred to copending application Ser. No. 10/351,030, which has been incorporated herein by reference.

The function of semantic processor 100 in a storage server context can be better understood with a specific example. In this example, CIFS commands and data structures are used with an Ethernet/IP/TCP supporting structure. Those skilled in the art will recognize that the concepts illustrated readily apply to other server communication protocols as well.

Figure 4:
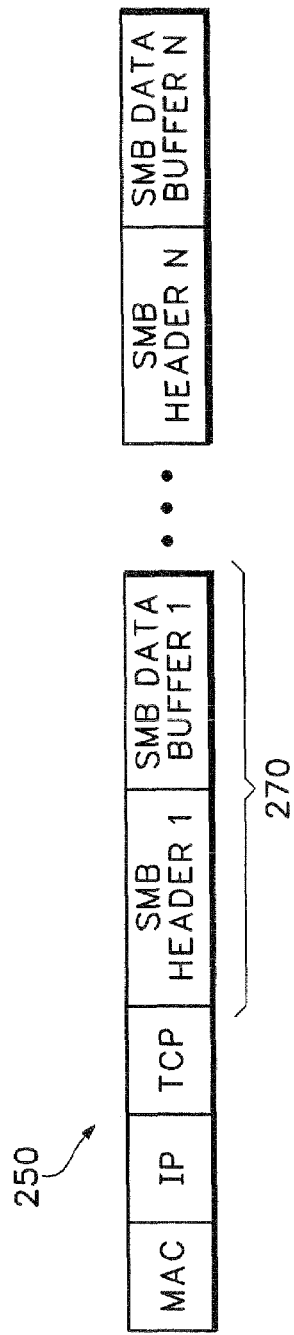
FIG. 4 shows the general structure of an Ethernet/IP/TCP/CIFS storage server client request frame.

FIG. 4 shows pertinent header/data blocks of an Ethernet/IP/TCP/CIFS frame 250 (ignoring trailers and checksums). The MAC header will contain, among other things, the MAC address of server 200 for any frame intended for server 200. Server 200 can support several network and transport protocols, but this example uses an Internet Protocol (IP) network header and Transmission Control Protocol (TCP) transport protocol header. Following the TCP header are a CIFS Storage Message Block (SMB) header HEADER1 and a SMB data buffer BUFFER1 containing data related to HEADER1. Many CIFS opcodes can be combined with other CIFS opcodes in the same SMB if desired, as long as the maximum frame length is not exceeded. The additional headers for second, third, etc. opcodes contain only the last few fields of the first header, with all other fields implied from the first header. As shown, the last SMB header contains HEADERN and BUFFERN.

Figure 5:
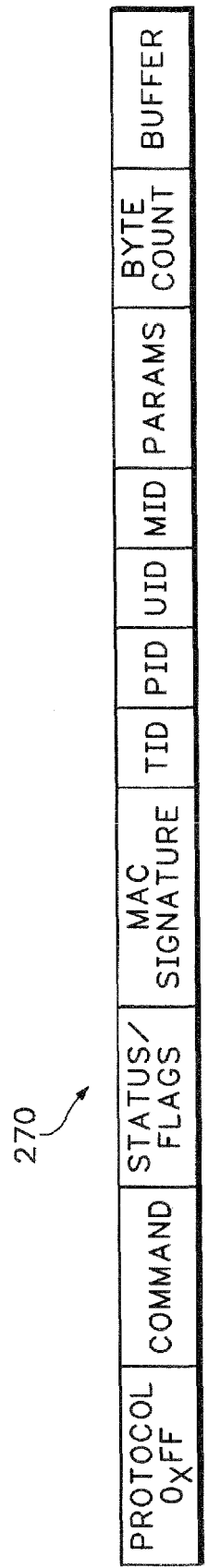
FIG. 5 shows details of a Storage Message Block portion of the CIFS frame structure of FIG. 4.

FIG. 5 shows additional detail for the first SMB header and buffer of a frame. A full SMB header first indicates its protocol, i.e., a character 0xFF indicates that this is an SMB header. A command character follows the protocol character, and indicates an operation code (opcode) for an operation that is either being requested or responded to. The status and flags field determine how other fields of the SMB should be interpreted, and/or whether an error occurred. The MAC signature (in this instance MAC stands for Media Authentication Code), when valid, can be used to authenticate messages.

The next four fields in the SMB are the TID, PID, UID, and MID fields. A TID (Tree Identifier) is assigned by a server to a client when the client successfully connects to a server resource. The client uses the assigned TID to refer to that resource in later requests. A PID (Process Identifier) is assigned by a client—although the server notes it and uses it to reply to the client, its use is primarily up to the client. A UID (User Identifier) is assigned by a server to identify the user that authenticated the connection. A MID (Multiplex Identifier) allows a client to use the same PID for multiple outstanding transactions, by using a different MID for each transaction.

The Parameters field is of variable length and structure, with its first character generally indicating the length of following parameters, followed by the parameter words appropriate for the SMB opcode. If the opcode is one that indicates a second SMB header and buffer follows, some of the parameter words indicate the follow-on opcode and offset to the follow-on shortened header.

The SMB ends with a byte count and buffer of byte count length. Such a buffer is used, e.g., to send a filename, transfer write data to a server, or transfer read data to a client.

With this background, an explanation of basic CIFS functionality for semantic processor 100 (FIG. 3) can proceed.

Referring to FIGS. 3 and 4, each new frame received at buffer 130 starts with a MAC header. The MAC header contains a destination address, a source address, a payload type field, a payload, and a checksum. DXP 140 parses the destination address for a match to the address(es) assigned to storage server 200, and to a broadcast address. If the destination address fails to parse, the DXP launches a SEE code segment on SEE 150 to flush the frame. Otherwise, the source address is consumed by a SEE and saved for use in reply, and the payload type field is parsed.

In this example, the MAC payload type parses to IP. The DXP consequently loads production rules for IP header parsing onto its parser stack, and works through the IP header. This may include, for instance, parsing the destination IP address to ensure that the packet was intended for the storage server, dispatching a SEE to check the IP header checksum, update addressing tables, save the destination and source addresses for return packet and other processing, and/or reassemble IP fragmented packets. The protocol indicated in the IP header is parsed to load production rules for the next header (in this case a TCP header) onto the DXP parser stack.

The TCP header is then parsed. A SEE is dispatched to load the TCP connection context associated with the destination IP address, source IP address, destination port, and source port (if a valid connection exists—a condition that is assumed for this example). The SEE then consumes the sequence number, acknowledgment number, window, checksum, and other fields necessary to update the connection context. The connection context is saved for use in reply.

Assuming that the MAC, IP, and TCP headers have parsed to a valid connection to the storage server, the next symbol on the input stream will indicate that the data contains an SMB request. DXP 140 parses this symbol and loads CIFS grammar production rules onto its stack.

The next input symbol will be matched with a non-terminal symbol for a CIFS command (CIFS opcode). For instance, the parser table can contain an entry for each possible combination of CIFS opcode and this non-terminal symbol. When the CIFS command is parsed, grammar pertinent to the CIFS opcode in the command field is loaded on to the parser stack.

The status and flags fields of the CIFS header can be parsed, but preferably are consumed by SEE 150 and saved in machine context 160 for use as necessary in interpreting packet contents.

The MAC signature, TID, PID, UID, and MID fields are also directed to a SEE, which saves the fields for use in constructing a return frame, and performs lookups in machine context 160 to authenticate the packet as originating from a valid source and directed to a proper resource.

The Parameters field format varies with CIFS opcode. Depending on the opcode, it may be preferable to parse elements of the Parameters field, or instruct SEE 150 to consume the Parameters using a segment of microcode. Several examples for common CIFS commands will be given.

A CIFS NEGOTIATE client request is used by a new client to identify the CIFS dialects that the client can understand. The Parameters field for NEGOTIATE include a ByteCount, followed by ByteCount symbols that list the acceptable dialects as null-terminated strings. The production rule for NEGOTIATE prompts DXP 140 to cause SEE 150 to save the ByteCount, and then DXP 140 parses the first input string up until a NULL character. If the string parses to a known dialect, DXP 140 causes SEE 150 to save a code for that dialect to the current frame context. SEE 150 also determines whether ByteCount symbols have been parsed, indicating that all dialects have been parsed. If not, SEE 150 pushes a non-terminal symbol onto the top of the parser stack, causing DXP 140 to parse the remaining input for another dialect. This process continues until ByteCount symbols have been parsed. At that time, SEE 150 pushes a symbol onto the head of the input stream to cause DXP 140 to stop parsing for dialects. DXP 140 then finishes parsing the packet and instructs SEE 150 to select a dialect (e.g., according to a pre-programmed hierarchical preference) and send a response packet back to the client with parameters pertaining to a new session. SEE 150 also sets up a new session context within machine context 160.

When a client receives a NEGOTIATE reply, normally the client will send an SMB for SESSION_SETUP_ANDX to complete the session. DXP 140, upon receiving this SMB, can parse the first Parameter (WordCount) and verify that it is correct for the opcode. The second Parameter, AndXCommand, indicates whether (and which) secondary command X also appears in this frame, following this command (CIFS uses "AndX" to identify opcodes that can be concatenated with a following opcode to form a multi-opcode SMB). If AndXCommand indicates that no second opcode is present (0xFF), DXP 140 can parse this and continue. If a separate opcode is present, processing is more complicated.

The second opcode can be handled in several ways. One way is to write a separate grammar variant for each possible combination of first and second opcodes. This is feasible, but potentially inefficient, depending on parser table and production rule table constraints. Another way is to use a multi-level grammar, with a higher level grammar parsing opcodes and a lower level grammar further processing each parsed opcode. A third method is to use a pushback mechanism from SEE 150. In this method, for instance, the AndXCommand Parameter loads a production rule that causes SEE 150 to save the AndXCommand from the input stream. When the first opcode has been completely parsed, SEE 150 is prompted to run a microcode segment that pushes the AndXCommand Parameter back onto the head of the input stream. DXP 140 then parses the new opcode and continues from that point, loading Parameter field grammar for the new opcode if a second opcode is present. Additional AndX commands in the SMB can be handled in the same manner.

The other Parameters of SESSION_SETUP_ANDX likely will be consumed by SEE 150 without parsing, as most contain parameters to be saved in the session context, or verified, in the case of a password. Null-terminated string parameters can be parsed to locate the null termination symbols, followed by an instruction to SEE 150 to save the symbols whose length is now determined.

Once the SESSION_SETUP_ANDX command has been parsed, SEE 150 can be commanded to build a response packet. If a second opcode was included, however, the packet will not be finalized until each opcode has been processed.

A LOGOFF_ANDX command is used to end a session. The primary function performed by the semantic processor in response to this opcode is to cause SEE 150 to remove the session context for that session from machine context 160.

A TREE_CONNECT_ANDX command is used to connect the session with a shared server resource indicated by a parameter string Path. The Path string included with this command could be parsed only for length, and/or parsed for correct server name. The remainder of the Path name could be parsed, although since valid paths can be created and destroyed frequently on a writeable resource, keeping the production rule codes correct for each directory may be challenging. Accordingly, the path would typically be passed to SEE 150 for opening. Alternately, DXP 140 could parse for "/" characters and pass the path to SEE 150 one level at a time.

SEE 150 traverses the specified path by reading directories stored on data storage device 120 across block I/O bus 110, starting with the root directory, and verifying that the requested path exists and is not restricted from the client. Assuming the path is valid and available, SEE 150 builds a response packet and saves the path in the session context.

The NT_CREATE_ANDX command creates or opens a file or directory. Like with the tree connect command, DXP 140 may hand off the bulk of this command to SEE 150 for block I/O transactions with data storage device 120. SEE 150 will open and/or create the file, if possible, by modifying the appropriate directory, assigning a file identifier (FID) to the open file, and creating a file context for the open file in machine context 160. SEE 150 then formats the appropriate response frame indicating the results of the file create/open request.

The READ_ANDX and WRITE_ANDX commands are used by a client to read and write data from/to an open FID. When the DXP parses down to the FID parameter, it signals SEE 150 to take FID off of the Si-Bus and locate the corresponding file context in machine context 160. SEE 150 then performs the appropriate block I/O transactions to read or write data on data storage device 120, and constructs a return packet to the client. It is noted that a write operation return frame could optionally be generated and sent before all block I/O transactions with the data storage device are completed.

The commands presented above are a subset of possible CIFS commands. Those skilled in the art can appreciate, from the examples above, how a semantic processor can implement full CIFS functionality. Further, the concepts exemplified by the semantic processor performing these CIFS commands are applicable in implementing other storage server protocols on a semantic processor.

Figure 6:
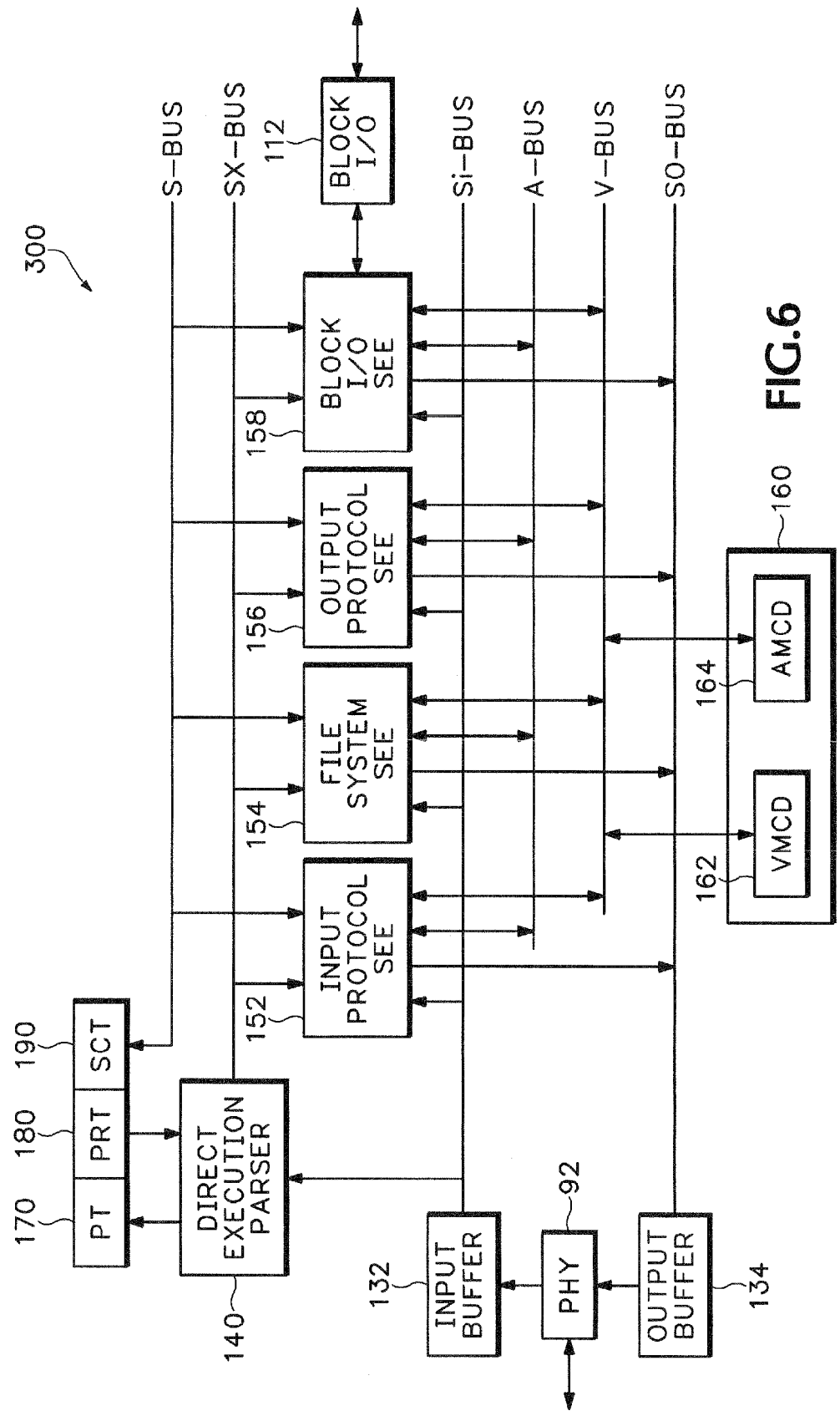
FIG. 6 illustrates, in block form, one semantic processor implementation useful with embodiments of the present invention.

FIG. 6 shows another semantic processor embodiment 300. Semantic processor 300 contains four semantic code execution engines 152, 154, 156, and 158. Semantic code execution engine 158 communicates with a block I/O circuit 112. Machine context 160 contains two functional units: a variable machine context data memory (VMCD) 162 and an array machine context data memory (AMCD) 164. Each SEE can transact with VMCD 162 across V-Bus and with AMCD 164 across A-Bus.

In semantic processor 300, when DXP 140 determines that a SEE task is to be launched at a specific point in its parsing, DXP 140 signals one of the SEEs to load microinstructions from SCT 140. The handle for some instruction segments may indicate to DXP 140 that it may choose any available SEE, or the handle may indicate that a specific SEE (for instance SEE 158, which has sole access to block I/O 112) should receive that code segment. The availability of multiple SEEs allows many tasks to proceed in parallel, without some slow tasks (like block I/O) blocking all processing.

Although not strictly necessary, specific kinds of tasks also can be assigned to specific SEEs. For instance, SEE 152 can be a designated input protocol SEE, responsible for handling the input side of IP, TCP, and other protocols, and updating client, session, and file contexts with data from incoming CIFS frames. SEE 154 can be designated to perform file system operations, such as comprehending and updating directories, file allocation tables, and user/password lists, authenticating users and requests, etc. SEE 156 can be designated to handle the output side of protocols, e.g., building response frames. And SEE 158 can be designated to handle transactions with the data storage device(s). With such partitioning, one SEE can launch microcode on another SEE without having to go through DXP 140, which may have moved on to a different parsing task. For instance, SEE 154 can launch tasks on block I/O SEE 158 to retrieve or update directories. As another, example, output protocol SEE 156 can have a semaphore that can be set by another SEE when data is ready for a response packet.

Each SEE contains pipeline registers to allow machine-context access to data. As opposed to a standard CPU, the preferred SEE embodiments have no notion of the physical data storage structure used for the data that they operate on. Instead, accesses to data take a machine-context transactional form. Variable (e.g., scalar) data is accessed on the V-bus; array data is accessed on the A-bus; and input stream data is accessed on the Si-bus. For instance, to read a scalar data element of length m octets located at a given location offset within a data context ct, a SEE uses an instruction decoder to prompt the V-bus interface to issue a bus request {read, ct, offset, m}. The context mct refers to the master context of the semantic processor; other sub-contexts will usually be created and destroyed as the RSP processes input data, such as a sub-context for each active CIFS session, each open file, each open transaction, etc.

Once a SEE pipeline register has been issued a command, it handles the data transfer process. If multiple bus transfers are required to read or write m octets, the pipeline register tracks the transaction to completion. As an example, a six-octet field can be transferred from the stream input to a machine-context variable using two microinstructions: a first instruction reads six octets from the Si-bus to a pipeline register; a second instruction then writes the six octets from the register to the machine-context variable across the V-bus. The register interfaces perform however many bus data cycles are required to effect the transfer.

VMCD 162 serves the requests initiated on the V-bus. VMCD 162 has the capability to translate machine-context variable data requests to physical memory transactions. Thus VMCD 162 preferably maintains a translation table referencing machine context identifiers to physical memory starting addresses, contains a mechanism for allocating and deallocating contexts, allows contexts to be locked by a given SEE, and ensures that requested transactions do not fall outside of the requested context's boundaries. The actual storage mechanism employed can vary based on application:

the memory could be completely internal, completely external, a mix of the two, a cache with a large external memory, etc. An external memory can be shared with external memory for other memory sections, such as the AMCD, input and output buffers, parser table, production rule table, and semantic code table, in a given implementation.

The A-bus interface and AMCD 164 operate similarly, but with an array machine context organization. Preferably, different types of arrays and tables can be allocated, resized, deallocated, written to, read from, searched, and possibly even hashed or sorted using simple bus requests. The actual underlying physical memory can differ for different types of arrays and tables, including for example fast onboard RAM, external RAM or ROM, content-addressable memory, etc.

The storage server organization shown in FIG. 3 is one of many possible functional partitions of a server according to an embodiment of the present invention. Some other possible configurations are shown in FIGS. 7-10, as described below.

Figure 7:
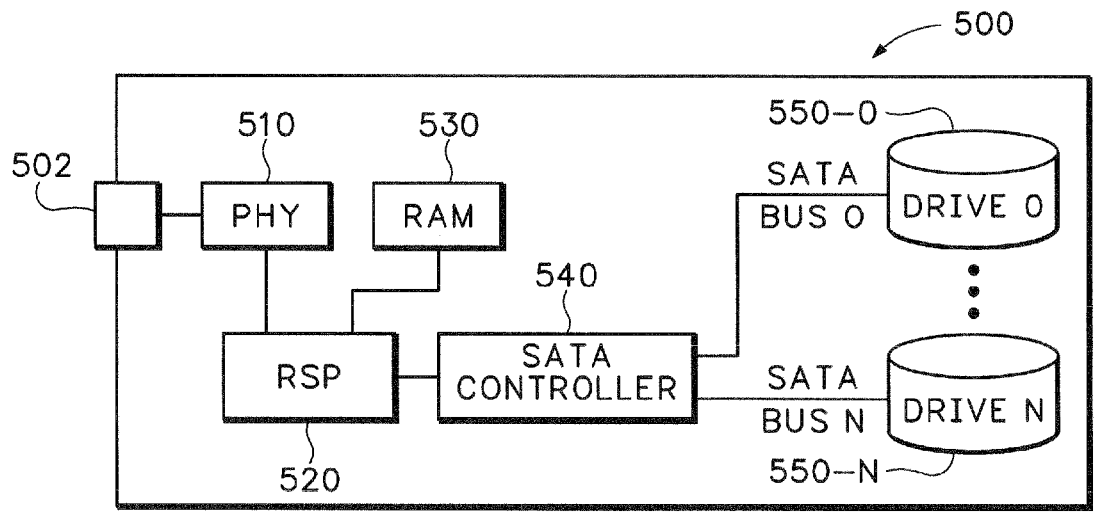
FIG. 7 shows a block diagram for a storage server embodiment with several physical data storage devices.

FIG. 7 illustrates a storage server 500 with interfaces for one or more conventional SATA drives. A network connection 502 (such as a standard electrical or optical connector port or antenna) allows clients to communicate with a PHY 510 supporting a desired protocol, such as Fibre Channel, Ethernet, etc. For Ethernet, a commercially available PHY such as a Broadcom BCM5421 or a Marvell 88E1011 can be used.

PHY 510 supplies input frames to, and drives output frames from, an RSP 520. RSP 520 can be configured in one of the configurations described above, one of the configurations described in copending application Ser. No. 10/351,030, or any other functionally similar semantic processing configuration.

RAM 530 provides physical storage, e.g., for machine context and buffers, to RSP 520. RAM 530 may comprise several types of memory (DRAM, Flash, CAM, etc.), or a single type such as Synchronous DRAM. A boot ROM or boot Flash memory can be used to initialize RSP 520 when parser, production rule, and semantic code tables are stored in volatile memory during operation. Part of the non-volatile table storage could also exist on the data storage device(s), as long as enough code is available in boot memory to allow RSP 520 to communicate with the data storage device(s).

A SATA controller 540 connects to a block I/O port of RSP 520 to serve the disk access requests of RSP 520. SATA controller 540 can be, e.g., a commercially available SATA controller such as a SII 3114 or a Marvell 88SX5080.

Serial ATA controller 540 connects to one or more SATA data storage devices via SATA bus(es). As shown, storage server 500 supports drives 550-0 through 550-N, respectively, through SATA buses BUS0 through BUSN.

PHY 510, RSP 520, RAM 530, and SATA controller 540 are preferably interconnected on a common printed circuit board (not shown). The circuit board can be arranged with the drives in a common enclosure, with SATA cabling providing BUS0 through BUSN. Alternately, SATA bus signaling can be routed on the printed circuit board to connectors for each drive, or through a connector to a backplane.

Figure 8:
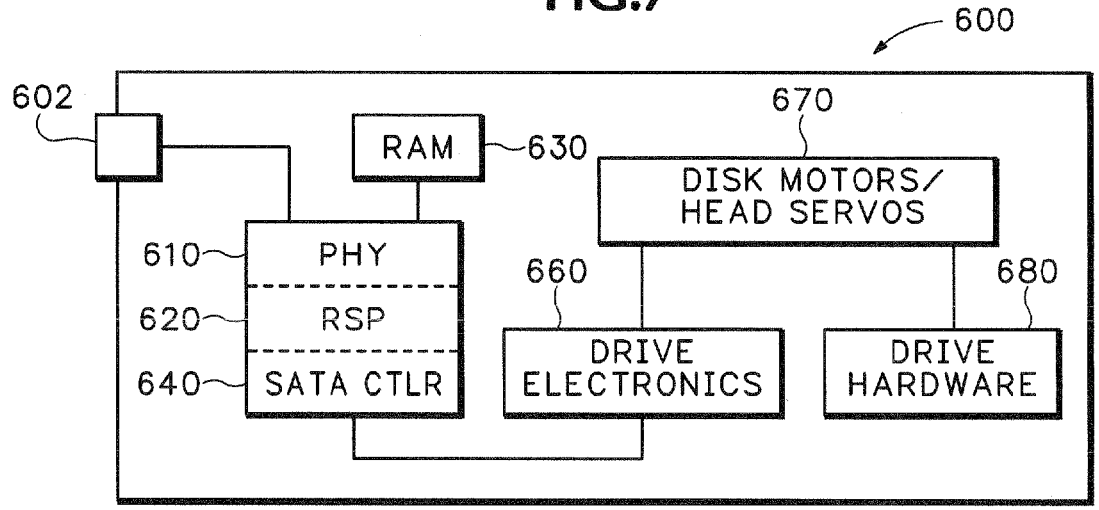
FIG. 8 illustrates a block diagram for an embodiment of the invention that can be implemented on the printed circuit board of a data storage device.

Another storage server implementation 600 is shown in FIG. 8. Preferably, in this implementation the entire server is implemented on the printed circuit board of a disk drive, with a network connection 602 for providing a connection to storage server clients. Although storage server architecture 500 could possibly be packaged in the same way, storage server 600 achieves space and cost savings by integrating a PHY 610 and an SATA controller 640 within an RSP 620. SATA controller 640 preferably is at least partially implemented using a SEE.

The SATA controller section of RSP 620 interfaces through an SATA cable or circuit board bus to drive electronics 660, which include an SATA interface, disk cache, and drive control electronics.

Figure 9:
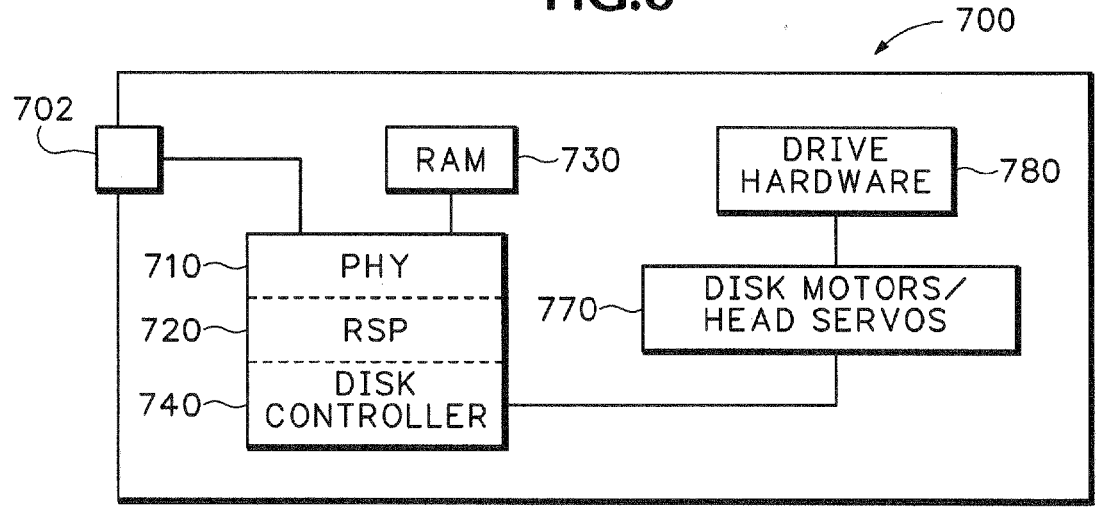
FIG. 9 shows a block diagram for am implementation with a semantic processor that communicates directly with the drive electronics of a disk.

With an entire storage server implemented on a common circuit board within a media device, it is possible to remove the SATA interface altogether, as shown in storage server 700 of FIG. 9. In FIG. 9, disk controller functionality is implemented within an RSP 740. The control devices (such as a Marvell 88C7500), motors, and servos shown as block 770 interface directly with RSP 740.

Figure 10:
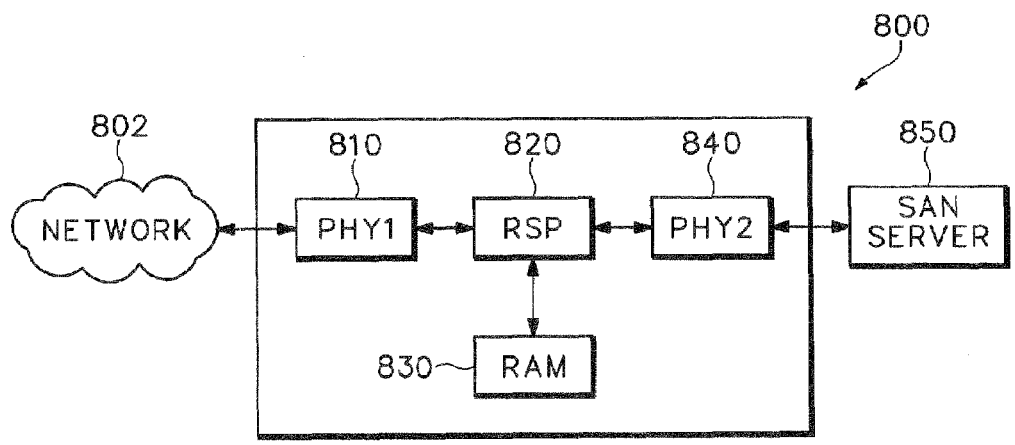
FIG. 10 shows a translator-storage server block diagram according to an embodiment of the invention.

FIG. 10 illustrates a storage server 800 that is essentially a "translation" gateway. Storage server 800 comprises a first network physical interface PHY1 (block 810) to connect to a network 802, and consequently to storage server clients. Storage server interface 800 also contains a second network physical interface PHY2 (block 840) to connect, across a network or point-to-point connection, to one or more physical servers, such as the illustrated SAN server 850. An RSP 820, with attached memory 830, attaches to PHY1 and PHY2. PHY1 can be, e.g., an Ethernet PHY, and PHY2 can be, e.g., a Fibre Channel PHY.

In operation, RSP 820 responds to client requests, such as NAS-style or application-style requests, by initiating requests on the remotely-attached server 850. Thus server 800 appears as a server to clients on network 802, and as a client to server 850. Although server 850 is illustrated as a SAN server, server 850 could be a NAS or even an application-style server. If PHY1 and PHY2 support the same server protocol, storage server 800 can still serve a useful function as an aggregation point for a scalable server farm, an encryption point, and/or firewall.

When both PHY1 and PHY2 are supplying datagrams to RSP 820, RSP 820 can provide parsing for both input streams. For instance, both PHY1 and PHY2 input streams can be saved to a common input buffer, and a DXP (not shown) in RSP 820 can alternately parse datagrams in both input streams, thus coordinating two-way translation tasks. RSP 820 could also be configured with two DXPs, one to serve each physical port, sharing a common bank of SEEs and other RSP resources.

Figure 11:
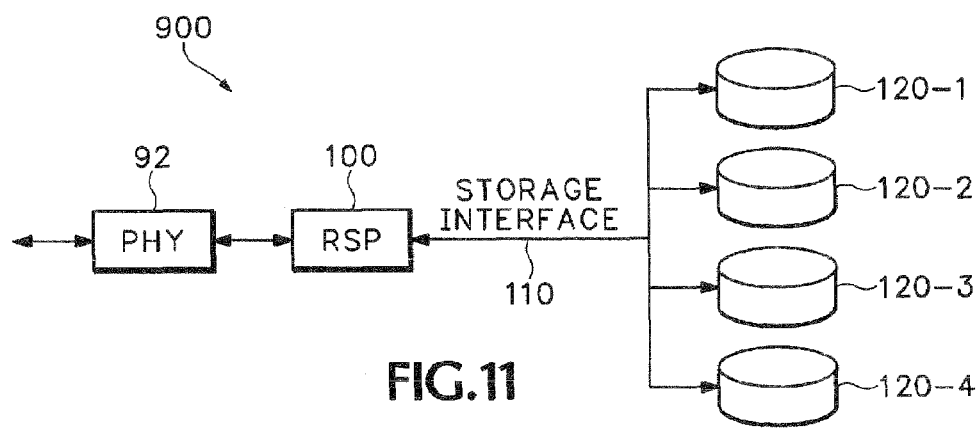
FIG. 11 illustrates a system embodiment wherein multiple physical data storage devices are accessed by the semantic processor over an external storage interface.
Figure 12:
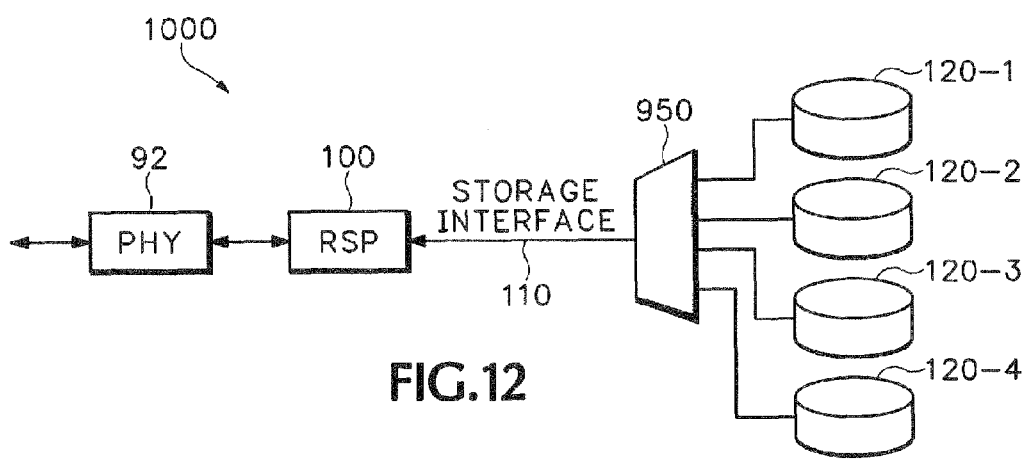
FIG. 12 illustrates a system embodiment wherein multiple physical data storage devices are coupled to the semantic processor through a port extender.

The preceding embodiments can be adapted to other system architectures that provide access to multiple physical data storage devices, such as those shown in FIGS. 11 and 12. In FIG. 11, a storage server 900 contains a storage interface connecting RSP 100 to multiple physical data storage devices, e.g., four devices 120-1, 120-2, 120-3, and 120-4 as shown. These data storage devices can be accessed in some embodiments as a RAID (Redundant Array of Independent Disks) array, with either the RSP acting as a RAID controller, or with a separate RAID controller (not shown) implemented as part of storage interface 110. The four data storage devices can alternately be configured as a JBOD (Just a Bunch Of Disks) array.

Generally, RSP 100 can perform other forms of storage server virtualization for its clients. In one alternate form, disk sector addresses used by a client application are mapped by the RSP into C-H-S (Cylinder-Head-Sector) addresses of a specific device from one of many physical devices. In such a configuration, data storage devices 120-1 through 120-4 (and potentially many more such devices) need not be geographically co-located, allowing sophisticated control of physical resources and disk allocation for clients. The RSP can also function within a virtualization configuration where a separate intermediate device provides all or part of the virtualization functionality for clients.

FIG. 12 illustrates the use of an RSP 100 in a storage server system 1000 that incorporates a port extender 950. Port extender 950 connects to a single SATA controller port associated with RSP 100 (either internal or external), but communicates in turn with multiple physical data storage devices (e.g., devices 120-1 to 120-4 as shown). Such a configuration can increase overall system bandwidth while using only one port on the RSP for communication with data storage devices.

Figure 13:
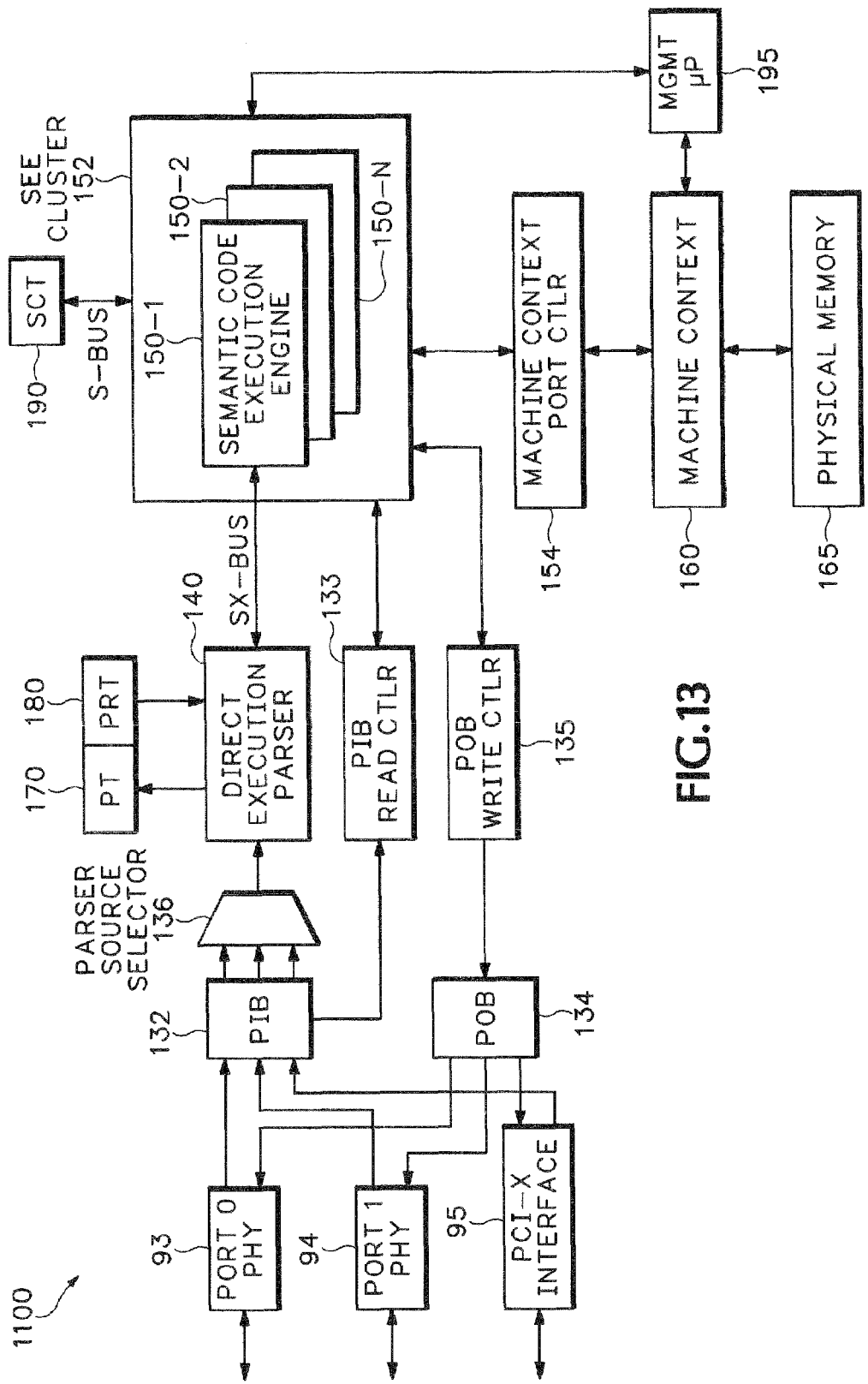
FIG. 13 illustrates yet another semantic processor implementation useful with embodiments of the present invention.

FIG. 13 shows yet another semantic processor implementation 1100 useful with embodiments of the present invention. Semantic processor 1100 communicates with a Port 0 PHY 93, a Port 1 PHY 94, and a PCI-X interface 95, each of which can be integrated with processor 1100 or connected externally to processor 1100, as desired. Buffer 130 of FIG. 3 is replaced with a Port Input Buffer (PIB) 132 and a Port Output Buffer (POB) 134, which preferably, but not necessarily, reside in a common memory section integrated as part of processor 1100. PIB 132 connects to and maintains at least one input queue for each of Port 0, Port 1, and the PCI-X interface, and may contains other queues as well. POB 134 connects to and maintains at least one output queue for each of Port 0, Port 1, and the PCI-X interface, and may contain other queues as well. Port 0 and Port 1 typically represent datagram interfaces such as Gigabit Ethernet, while the PCI-X interface couples to a familiar PXI-X bus. Depending on the storage server design, storage resources can couple to any of these ports, and clients can couple to either Port 1, Port 2, or both.

Unlike FIG. 3, in FIG. 13 direct execution parser 140 can receive input from each of the multiple input queues in PIB 132, through a parser source selector 136. For instance, direct execution parser 140 can maintain separate parser stacks for each input source, and can signal parser source selector to switch input sources each time a packet has finished parsing, or when parsing of one packet is stalled, e.g., while a SEE performs some calculation on a packet field.

SEE cluster 152 comprises N semantic code execution engines 150-1 to 150-N. The SEE cluster preferably includes a single dispatcher (not shown) to communicate with DXP 140 over the Sx-Bus, and to distribute tasks to the individual SEEs.

A PIB read controller 133 and a POB write controller block 135 provide access, respectively, to PIB 132 and POB 134 for SEE cluster 152. As shown, parser source selector 136 and PIB read controller 133 allow DXP 140 to work with data from one input while the SEE cluster accesses data from another input. PIB read controller 133 and POB write controller 135 preferably allow non-blocking access to the input and output buffers.

A machine context port controller 154 provides access to machine context 160 for SEE cluster 152. Like the port buffer controllers, machine context port controller 154 provides non-blocking access to machine context 160 for SEE cluster 152.

Machine context 160 prioritizes and executes memory tasks for SEE cluster 152 and for a management microprocessor 195, and typically contains one or more specialized caches that each depend on the attributes of the target data access. Machine context 160 can also contains one or more encryption and/or authentication engines that can be used to perform inline encryption/authentication. One or more traditional memory bus interfaces connect machine context 160 with physical memory 165, which can consist, e.g., of DRAM (Dynamic Random Access Memory), CAM (Content Addressable Memory), and/or any other type of desired storage. Physical memory 165 can be located on processor 1100, external to processor 1100, or split between these two locations.

Management microprocessor 195 performs any desired functions for semantic processor 1100 that can reasonably be accomplished with traditional software. For instance, microprocessor 195 can interface with its own instruction space and data space in physical memory 165, through machine context 160, and execute traditional software to boot the processor, load or modify the parser table, production rule table, and semantic code table, gather statistics, perform logging, manage client access, perform error recovery, etc. Preferably, microprocessor 195 also has the capability to communicate with the dispatcher in SEE cluster 152 in order to request that a SEE perform tasks on the microprocessor's behalf. The management microprocessor is preferably integrated into semantic processor 1100.

Within the preceding embodiments, the semantic units can encrypt the blocks of data as the blocks are written to disk and/or decrypt the blocks of data as the blocks are read from disk. This provides security to the data "at rest" on the disk drive or drives. For instance, as the semantic units receive data payloads for writing to disk, one operation in preparing the data payloads for writing can include encrypting the packets. The reverse of this process can be used for reading encrypted data from the disk.

Although special-purpose execution engines have been shown and described, an alternative implementations can use the parser as a front-end datagram processor for a general purpose processor.

As exemplified by the preceding embodiments, many different semantic-processor based storage servers fall within the scope of the present invention. At the low-functionality end, a SAN-style server, e.g., connected by Fibre Channel to an enterprise network, is possible. NAS-style servers include more sophisticated features, such as those described in the detailed CIFS embodiment described above. Translation-gateway servers provide clients with access to a potentially large and changing underlying array of physical servers without allowing those clients visibility to the physical servers.

Both translation-gateway servers and physical servers can be structured as application style-servers. As an application-style server, data is served in an application-style format. For instance, a video-on-demand server can store videos for usage by multiple clients, and stream different parts of a video to different clients, allowing each to have independent navigation. A music-on-demand server can operate similarly.

Application-style servers can also supply storage space for applications, like a wired or wireless server that stores digital camera pictures off of a digital camera, allowing the camera to operate with a relatively small internal buffer and/or flash card. Such a server could be relatively small, battery-powered, and portable for field use.

Semantic processor storage server implementations can also implement wireless protocols, e.g., for use in a home computer data and/or audio/video network. Although the detailed embodiments have focused on traditional "storage" devices, printers, scanners, multi-function printers, and other data translation devices can also be attached to a semantic processor storage server.

One of ordinary skill in the art will recognize that the concepts taught herein can be tailored to a particular application in many other advantageous ways. It is readily apparent that a semantic processor storage server can be made to serve different client types by changing the protocols that can be parsed by the server. If desirable, the storage server could even parse multiple storage server protocols simultaneously to allow access by different classes of clients (e.g., SAN access by trusted clients and NAS access by others).

Those skilled in the art recognize that other functional partitions are possible within the scope of the invention. Further, what functions are and are not implemented on a common integrated circuit can vary depending on application.

Finally, although the specification may refer to "an", "one", "another", or "some" embodiment(s) in several locations, this does not necessarily mean that each such reference is to the same embodiment(s), or that the feature only applies to a single embodiment.

What is claimed is:

1. A storage server comprising:
a datagram interface to receive client requests for data operations;
a storage interface to access at least one data storage device; and
a semantic processor having at least one direct execution parser to parse received client requests, based on a stored grammar, and at least one semantic code execution engine to execute machine instruction segments identified by the direct execution parser during the parsing of the received client requests, in order to transact, through the storage interface, responsive data operations with the at least one data storage device.

2. The storage server of claim 1, further comprising the at least one data storage device.

3. The storage server of claim 2, wherein the storage interface comprises a disk controller and a bus connecting the disk controller and the at least one data storage device.

4. The storage server of claim 3, wherein the data storage device comprises a printed circuit board with drive electronics, wherein the disk controller and semantic processor are mounted on the printed circuit board and the bus comprises printed circuit board traces connecting the disk controller and the drive electronics.

5. The storage server of claim 4, wherein the disk controller and semantic processor are integrated in a common semiconductor package.

6. The storage server of claim 1, wherein the at least one data storage device is a disk drive having an enclosure, and wherein the datagram interface, storage interface, and semantic processor are packaged within the disk drive enclosure.

7. The storage server of claim 6, further comprising a portable power supply, wherein the storage server is portable during operation.

8. The storage server of claim 7, wherein the datagram interface is a wireless interface.

9. The storage server of claim 1, wherein the storage interface is a secondary datagram interface and the at least one data storage device is accessed remotely over the secondary datagram interface, wherein the storage server can operate as a client of the at least one data storage device in order to serve client requests received by the storage server.

10. The storage server of claim 9, wherein the at least one data storage device comprises multiple data storage devices, wherein the semantic processor accesses the multiple data storage devices as a Redundant Array of Independent Disks.

11. The storage server of claim 9, wherein the storage interface comprises a port extender that allows a single port on the semantic processor to communicate with multiple data storage devices.

12. The storage server of claim 9, wherein the semantic processor translates between different storage server protocols at the two datagram interfaces.

13. The storage server of claim 9, wherein the semantic processor parses datagrams received at both datagram interfaces using a common direct execution parser.

14. The storage server of claim 9, the semantic processor comprising a separate direct execution parser for each datagram interface.

15. The storage server of claim 1, further comprising a reconfigurable memory to hold at least a portion of the stored grammar, such that the storage server is reconfigurable to function as a storage server with at least two different storage server protocol sets.

16. The storage server of claim 1, wherein the semantic processor comprises a direct execution parser to parse symbols from datagrams received at the datagram interface, and a plurality of semantic code execution engines to perform data operations as directed by the direct execution parser.

17. The storage server of claim 16, wherein at least one of the semantic code execution engines performs all storage server operations of a given type.

18. The storage server of claim 17, wherein a semantic code execution engines that performs all storage server operations of a given type is capable of performing those operations upon request from another of the semantic code execution engines.

19. The storage server of claim 16, wherein at least one of the semantic code execution engines is capable of performing encryption for data written to the data storage device and/or decryption for data read from the data storage device.

20. The storage server of claim 1, wherein the direct execution parser is configured to parse symbols from datagrams received at the datagram interface, and a microprocessor to perform data operations on the parsed datagrams.

21. The storage server of claim 1, wherein the semantic processor comprises a machine context memory organized to store subcontexts for storage server sessions, open files, and pending data operations requested by a client.

22. The storage server of claim 1, wherein the server streams data to clients as part of an application.

23. The storage server of claim 1, wherein the server is a Network Attached Storage server.

24. The storage server of claim 1, wherein the server is a Storage Area Network server.

25. The storage server of claim 1, wherein the direct execution parser having a parser stack, to parse symbols from datagrams received at the datagram interface according to stack symbols and the at least one semantic code execution engine to perform data operations as directed by the direct execution parser, the semantic code execution engine having the capability to alter the direct execution parser operation by modifying the contents of the parser stack.

26. The storage server of claim 1, wherein the datagram interface is selected from the group of interfaces comprising Fibre Channel, IEEE 802 datagram protocols, Ethernet, and combinations thereof.

27. The storage server of claim 1, wherein the storage interface is selected from the group of interfaces comprising ATA, SATA, switched SATA, port-multiplexed SATA, SCSI, SAS, Fibre Channel, IEEE 802 datagram protocols, Ethernet, and combinations thereof.

28. The storage server of claim 1, further comprising a second datagram interface to receive client requests for data operations, and a parser source selector to allow the semantic processor to switch between parsing datagram symbols from the two datagram interfaces.

* * * * *